INVENTOR
Hellmut Muller
By Bailey, Stephens Huettig
ATTORNEYS

July 13, 1965  H. MÜLLER  3,193,905
CONVEYING AND SUPPORTING DEVICE FOR CONVEYING
AND DISPLACING HEAVY OBJECTS
Filed Sept. 8, 1961  2 Sheets-Sheet 2
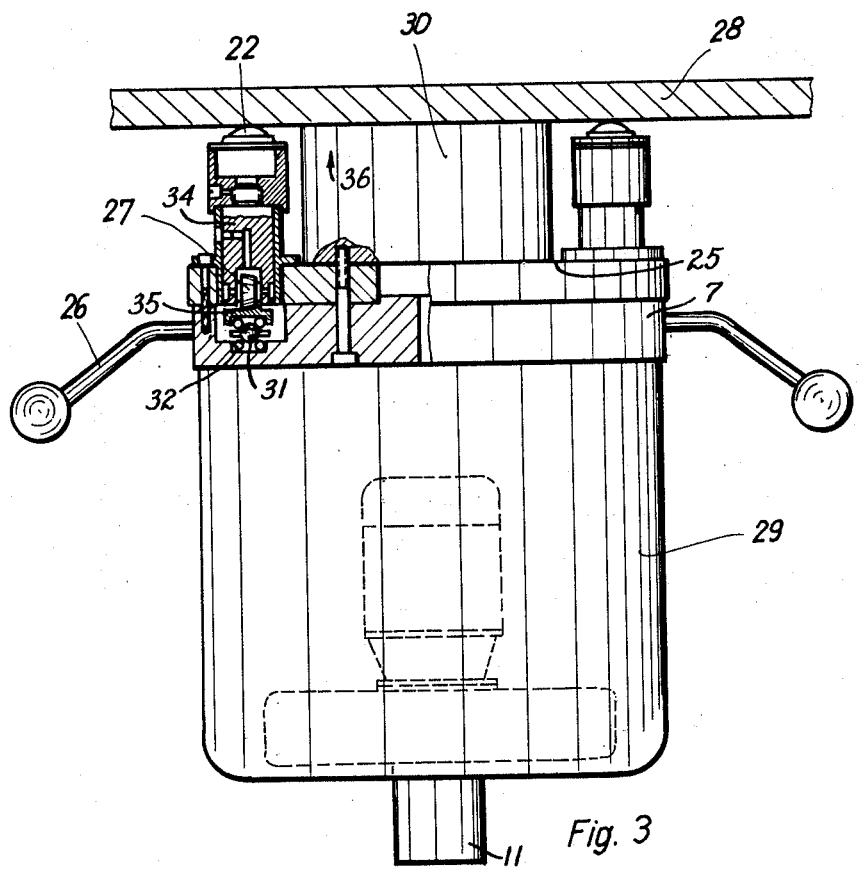
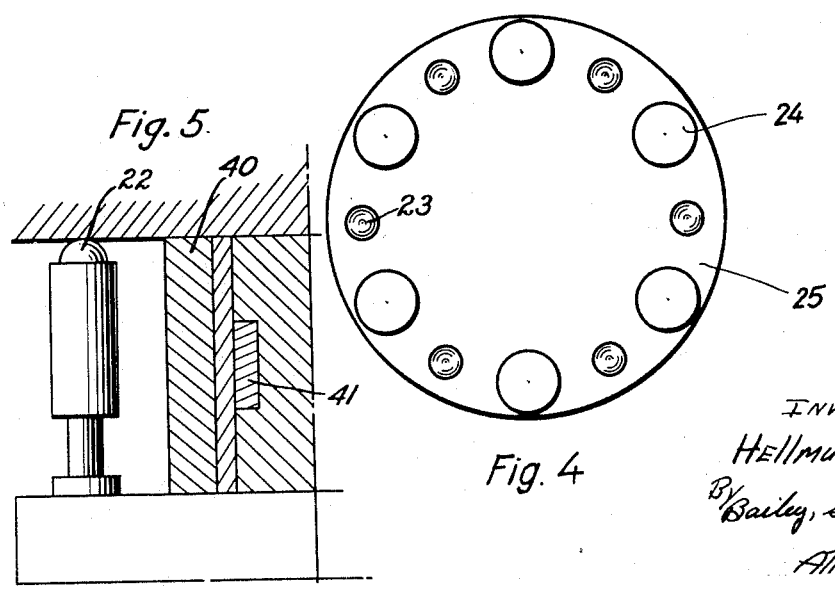
INVENTOR
Hellmut Muller
By Bailey, Stephens & Huettig
Attorneys

United States Patent Office 3,193,905
Patented July 13, 1965

3,193,905
CONVEYING AND SUPPORTING DEVICE FOR CONVEYING AND DISPLACING HEAVY OBJECTS
Hellmut Müller, Fabrikstrasse 34, Plochingen (Neckar), Germany
Filed Sept. 8, 1961, Ser. No. 136,816
Claims priority, application Germany, Sept. 13, 1960, M 46,543
12 Claims. (Cl. 29—1)

This invention relates to a conveying and supporting device for conveying and displacing heavy objects such as tools for machining work pieces along a stationary guiding and supporting surface. In order to be able to move the objects with as little expenditure of force as possible, with such devices the friction forces must be as low as possible by correspondingly reducing the coefficient of friction and the normal pressure action. Therefore, the hitherto known devices of this kind have as small a weight as possible and use anti-friction guide and bearing organs. However, the heavier the objects to be conveyed are, the greater is the friction force and, therefore, also the expenditure of moving force.

It is an object of the invention to provide a device of the above mentioned general character which consists of a movable carrier body for conveying and supporting the object to be conveyed and displaced, of guide means movable with said carrier body and mediating between said movable carrier body and said stationary guiding and supporting surface, and of magnet means fixedly connected with said carrier body and electromagnetically cooperating with said guiding and said supporting surface.

Another object of this invention is to provide a device of the general character described with which even with increasing load the normal pressure effect can be made so low that the friction force is without importance during the displacement and with which the carrier body can be at any time easily fixed and locked in position after the desired working position has been reached.

A still other object of the invention is to provide a device of the above described character which can be used as carrier for work pieces or tools or as conveying device in workshop or factory halls or in rooms in which the radiation danger is great such as rooms in which there are handled isotopes.

A further object of the invention is to provide a device of the above mentioned general character in which the magnet means is used either to retain by magnetic attraction the carrier body onto the guiding and supporting surface situated thereabove or to so repel the carrier body from its guiding and supporting surface situated therebeneath that it can be displaced along this latter-named surface with as small an expenditure of moving force as possible.

A still further object of the invention is to provide a device of the character described with which the magnetic force of the magnet means can be varied, if need be, for example by means of a potentiometer.

These and other objects, features, and advantages of the present invention will become further apparent from the following detailed description thereof.

Several embodiments of the invention are illustrated, by way of example, in the drawings, in which:

FIG. 3 is a partly sectional enlarged scale detailed side view of the device shown in FIG. 1, FIG. 4 is a schematical plan view of a further modified embodiment of the device shown in FIG. 3, FIG. 5 is a side elevation, partly in section, showing the use of two magnets.

Figure 1:
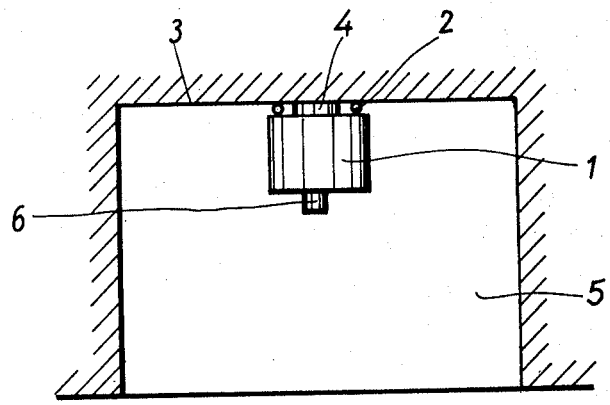
FIG. 1 is a schematical side view of a device according to the invention.

In FIG. 1 there is shown a conveying and supporting device according to the invention which consists of a carrier body 1 serving to carry the object to be conveyed and displaced, of guide means 2 which may be balls mounted like balls 22 in FIG. 3 arranged intermediate the carrier body 1 and the guiding and supporting surface 3 and which is movable with the carrier body and thereby mediates between this latter and the stationary guiding and supporting surface 3, and of a magnet means 4 which is fixedly connected with the carrier body 1 and magnetically cooperates with the guiding and supporting surface 3. This guiding and supporting surface pertains to the room 5. On the carrier body 1 there can be provided a tool as shown at 6, whereby in this case the carrier body acts as a tool carrier and is housed together with the drive of the tool spindle within a common casing so as to form therewith a unit. During its displacing movement, the carrier body is retained onto the guiding and supporting surface with the aid of the above said magnet. The retaining magnetic force of said magnet is so great that between the carrier body and the guiding and supporting surface there is always a good contact while at the same time the displacing movement of the carrier body along the guiding and supporting surface is not substantially hindered in any way. The magnet can be designed as an electromagnet with a potentiometer enclosed in its energizing circuit with the aid of which potentiometer the magnitude of the magnetic force exerted by the electromagnet may be adjusted. However, the magnet can also be designed as a permanent magnet surrounded by coils to be connected and disconnected therewith and with the aid of which it can be influenced electrically in a manner known per se in order to be infinitely variably magnetized and demagnetized so as to correspondingly vary its magnetic retaining force.

Figure 2:
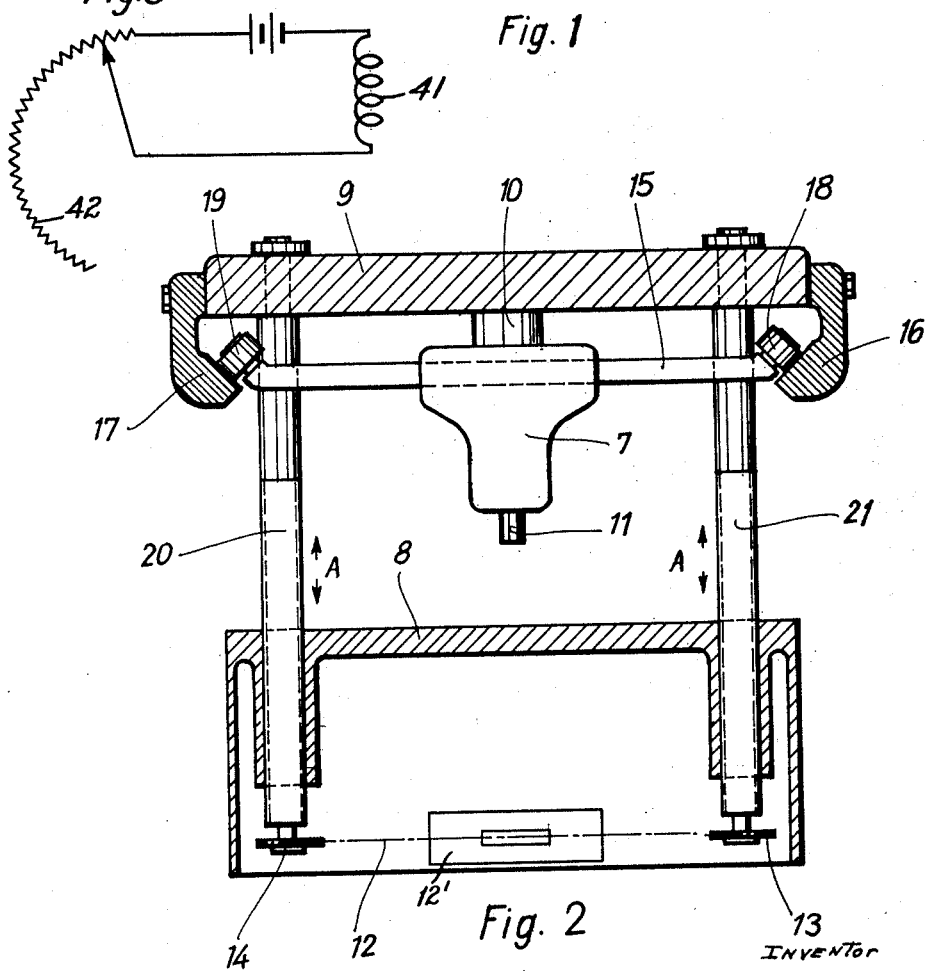
FIG. 2 is a partly sectional side view of a modified form of the invention.

In the embodiment according to FIG. 2, the tool carrier 7 is arranged on rotatable externally threaded columns 20, 21 threaded in table 8 so as to be displaceable in a plane parallel to the supporting surface for the work piece forming part of the work table 8 and so as to be fixable when in its respective working position onto the supporting face 9 with the aid of the magnet 10. The magnet may consist for example of an electromagnet with adjustable magnetic retaining force, which electromagnet may be switched off and on by means of a push button. 11 designates the tool spindle of the tool carrier. The supporting surface 8 may be adjusted as to its height as indicated by the arrows A—A by means of the drive comprising the chain 12 driven by motor 12' and the chain gears 13, 14. The tool carrier 7 may be displaced on the support rod 15 in the longitudinal direction thereof and may be moved together with this latter rod along the rails 16, 17 in a direction perpendicular thereto with the aid of the rolls 18, 19 mounted in ball bearings.

The guide organs may consist for example of rolls or balls 22, 23. According to FIG. 4, six of these rolls or balls may be located in ring like arrangement and alternating with the magnets 24 along the periphery of the carrier body 25 (FIG. 4). In order to fix and lock the device in its respective working position, between these rolls or balls and the magnets there is performed a relative movement, whereby either the magnet may be pushed outwards or the rolls or balls may be retracted with respect to the magnet under the influence of springs or under a hydraulic, pneumatical or mechanical action. In this case, the arrangement is such that during the displacement of the tool carrier and the supporting surface an air gap of adjustable magnitude is provided between the supporting surface and the magnet whereas after the conclusion of the displacement and after the tool carrier has been fixed and locked in its working position, the magnet bears fully and flatly the supporting surface. Upon the inversed relative movement between the rolls and the magnet, the rolls are pushed outward and the magnet is thereby lifted off the supporting surface.

Figure 6:
FIG. 6 is a wiring diagram related to FIG. 5.

In the embodiment according to FIG. 3 the rolls 22 are displaced by means of the lever 26 rigid with ring 35 journalled on balls 31 and pressed upward by springs 32. Ring 25 has a sloping surface so that when it is turned by lever 26, there takes place between the supporting face 28 and the carrier body indicated at 29 together with the magnet 30 a relative movement by which either an air gap is formed between the supporting face 28 and the surface of the magnet turned towards this face 28 or an intimate contact is caused between both these latter faces. When using the permanent magnet 40 (FIG. 5) for retaining the carrier body onto the supporting face, on the carrier body there can be provided at least one disconnectable electromagnet 41 with adjustable and regulatable magnetic force by potentiometer 42 (FIG. 6) which serves to fix and lock the carrier body in its respective position.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A device for operating on work pieces comprising a tool carrier and a downwardly directed tool carried by the carrier and positioned below it, a stationary substantially horizontal supporting surface above the carrier, guide means acting in a direction perpendicular to such surface situated intermediate said carrier and said stationary supporting surface on the opposite side of the carrier from the tool, said guide means including parts connected with said carrier so as to be movable therewith and with respect thereto, said guide means during movement of said movable carrier being interposed between said movable carrier and said stationary supporting surface, and magnet means fixedly connected with the carrier on the opposite side of the carrier from said tool, said magnet means being located adjacent to and magnetically cooperating with the lower face of said supporting surface, whereby said carrier can be moved over said supporting surface and after interruption of said movement of said carrier along said stationary supporting surface said magnet means affix said carrier onto said lower face of said supporting surface and said carrier is supported on its side opposite the tool.

2. The device set forth in claim 1, wherein said carrier body is retained onto said supporting surface during its displacing movement by said magnet means with so great a magnetic retaining force that contact with said supporting surface is always maintained without said displacing movement along said supporting surface being thereby substantially hindered.

3. The device set forth in claim 2, wherein an electromagnet is provided on said carrier body for retaining said carrier body on said supporting surface, a potentiometer in the energizing circuit of said electromagnet, said potentiometer serving to vary the magnitude of the magnetic retaining force exerted by said electromagnet.

4. The device set forth in claim 2, wherein a permanent magnet is provided on said carrier body, said permanent magnet serving to retain said carrier body on said supporting surface, said permanent magnet being electrically influenced by coils arranged therearound and connectable and disconnectable to a current source, whereby upon at least a partial magnetization or demagnetization of said permanent magnet by switching off and on said coils its magnetic retaining force is correspondingly varied.

5. The device set forth in claim 1, having a drive for the tool spindle, wherein said carrier body is a tool carrier and is united with the drive for the tool spindle to form a unit housed within a common casing, said casing carrying also said magnet means and said guide means, said guide means being constituted by bearing bodies and serving to make said carrier body displaceable to and fro in any direction without it being necessary to spend great displacing forces therefor.

6. The device set forth in claim 5, wherein said guide means are constituted by rolling members spaced uniformly along the periphery of the side of said carrier body facing said guiding and supporting surface, said rolling members being so arranged as to perform a relative movement with respect to said magnet means, whereby during the displacing movement of said tool carrier along said supporting surface an air gap of adjustable magnitude is provided between this latter surface and said magnet means and after the end of said displacing movement and after locking said tool carrier in its working position said magnet means bears fully and flatly and positively against said guiding and supporting surface.

7. The device set forth in claim 1, wherein said carrier body is provided with a permanent magnet for retaining it on said supporting surface and with at least one additional electromagnet, said electromagnet being de-energizable and having an adjustable and regulatable magnetic force, said additional electromagnet serving to fix and lock said carrier body in its respective working position.

8. The device set forth in claim 1, said supporting surface being vertically displaceable and being fixable in its respective position, said supporting face being arranged on a frame of movable construction, said carrier body carrying on its side facing said supporting face a magnet means with the aid of which it can be fixed to said supporting face in order to be locked in its respective working position.

9. The device set forth in claim 8, wherein said tool carrier is arranged on a standard adjustable as to height so that the tool carrier is displaceable in a plane parallel to the supporting face, whereby said tool carrier is fixable and lockable on said supporting face with the aid of a magnet means arranged on the side of said work carrier turned away from said work piece, said supporting face being adjustable as to the height.

10. A device for operating on work pieces comprising a tool carrier and a downwardly directed tool carried thereby, a stationary substantially horizontal supporting surface above the carrier, said driving spindle being at least approximately perpendicular to said stationary supporting surface, guide means acting in a direction perpendicular to such surface comprising parts mounted on said carrier on opposite sides of the tool for rotation with respect thereto, and magnet means independent of said guide means fixedly connected with the carrier on the opposite side thereof from the tool, said magnet means being located adjacent to and magnetically cooperating with the lower face of said guiding and supporting surface, whereby said carrier can be moved over said supporting surface and after interruption of said movement of said carrier along said stationary supporting surface said magnet means affix said carrier onto said lower face of said supporting surface and said carrier is supported on its side opposite the tool in a direction co-axial therewith.

11. A device for operating on work pieces comprising a tool carrier and a downwardly directed tool carried by the carrier and positioned below it, a stationary substantially horizontal supporting surface above the carrier, guide means acting in a direction perpendicular to such surface comprising parts mounted on said carrier on the opposite side of the carrier from the tool for rotation with respect to the carrier, and magnet means independent of said guide means fixedly connected with the carrier on the opposite side thereof from the tool, said magnet means being located adjacent to and magnetically cooperating with the lower face of said supporting surface, whereby said carrier can be moved over said supporting surface and after interruption of said movement of said carrier along said stationary supporting surface said magnet means affix said carrier onto said lower face of said supporting surface and said carrier is supported on its side opposite the tool.

12. A device for operating on work pieces comprising a tool carrier and a downwardly directed tool carried by the carrier and positioned below it, a stationary substantially horizontal supporting surface above the carrier, guide means situated intermediate said carrier and said stationary supporting surface on the opposite side of the carrier from said tool, said guide means including parts connected with said carrier so as to be movable therewith and with respect thereto, said guide means during movement of said movable carrier with respect to said stationary supporting surface being interposed between said movable carrier and said stationary supporting surface, and magnet means fixedly connected with the carrier on the opposite side of the carrier from the tool, said magnet means being located adjacent to and magnetically cooperating with the lower face of said supporting surface, whereby during movement of said carrier along said stationary supporting surface said magnet means hold said carrier onto said stationary supporting surface so as to be freely movable therealong and after interruption of said movement of said carrier along said stationary supporting surface said magnet means affix said carrier onto said lower face of said supporting surface and said carrier is supported on its side opposite.

References Cited by the Examiner

UNITED STATES PATENTS

| Re. 21,795 | 5/41 | Verderber | 77—4 |
|---|---|---|---|
| 634,165 | 10/99 | Croneau | 77—59 |
| 700,481 | 5/02 | Charles | 77—59 |
| 1,219,190 | 3/17 | Symes | 77—59 |
| 1,602,860 | 10/26 | Sleeper | 90—164 |
| 2,009,025 | 7/35 | Sargent et al. | 90—59 X |
| 2,015,809 | 10/35 | Moore | 198—41 |
| 2,104,062 | 1/38 | Temple | 198—41 X |
| 2,731,137 | 1/56 | Socke | 198—41 X |
| 2,863,338 | 12/58 | Stewart | 77—59 |
| 2,932,194 | 4/60 | Buck | 77—59.1 |
| 3,089,064 | 5/63 | De Bennetot | 317—123 |

RICHARD H. EANES, Jr., *Primary Examiner.*

WHITMORE A. WILTZ, *Examiner.*